(12) United States Patent
Crasovan et al.

(10) Patent No.: US 8,533,692 B2
(45) Date of Patent: *Sep. 10, 2013

(54) DYNAMIC SOFTWARE ENHANCEMENT PARAMETERS

(75) Inventors: Eveline H. Crasovan, Wiesloch (DE); Michael Acker, Grossfischlingen (DE); Juergen K. Remmel, Muehlhausen (DE); Thomas Fiedler, Pfinztal (DE)

(73) Assignee: SAP AG, Walldorf (DE)

( * ) Notice: Subject to any disclaimer, the term of this patent is extended or adjusted under 35 U.S.C. 154(b) by 1631 days.

This patent is subject to a terminal disclaimer.

(21) Appl. No.: 11/323,599

(22) Filed: Dec. 30, 2005

(65) Prior Publication Data

US 2007/0186211 A1   Aug. 9, 2007

(51) Int. Cl.
G06F 9/45 (2006.01)

(52) U.S. Cl.
USPC .......................................................... 717/140

(58) Field of Classification Search
USPC .......................................................... 717/140
See application file for complete search history.

(56) References Cited

U.S. PATENT DOCUMENTS

| | | | |
|---|---|---|---|
| 5,560,014 A | 9/1996 | Imamura | |
| 5,581,697 A | 12/1996 | Gramlich et al. | |
| 5,590,270 A | 12/1996 | Tsukuda et al. | |
| 5,748,975 A | 5/1998 | Van de Vanter | |
| 5,754,858 A | 5/1998 | Broman et al. | |
| 5,842,020 A | 11/1998 | Fausini | |
| 5,867,709 A | 2/1999 | Klencke | |
| 5,956,512 A | 9/1999 | Simmons et al. | |
| 6,163,879 A | 12/2000 | Mackey | |
| 6,182,274 B1 | 1/2001 | Lau | |
| 6,247,174 B1 | 6/2001 | Santhanam et al. | |
| 6,305,008 B1 | 10/2001 | Vaidyanathan et al. | |
| 6,473,897 B1 | 10/2002 | Ansari et al. | |
| 6,658,658 B1 | 12/2003 | Jones et al. | |
| 6,745,384 B1 | 6/2004 | Biggerstaff | |
| 6,928,536 B2 | 8/2005 | Duesterwald et al. | |
| 6,968,538 B2 | 11/2005 | Rust et al. | |
| 7,340,719 B1 * | 3/2008 | Bakerman et al. | 717/106 |
| 7,627,851 B2 | 12/2009 | Lotter | |
| 7,913,245 B2 * | 3/2011 | D'Angelo et al. | 717/169 |
| 8,171,452 B2 * | 5/2012 | Crasovan et al. | 717/111 |
| 2002/0029374 A1 * | 3/2002 | Moore | 717/1 |
| 2002/0092004 A1 | 7/2002 | Lee et al. | |
| 2003/0016246 A1 * | 1/2003 | Singh | 345/763 |
| 2003/0158760 A1 | 8/2003 | Kannenberg | |
| 2004/0031027 A1 * | 2/2004 | Hiltgen | 717/170 |

(Continued)

OTHER PUBLICATIONS

USPTO Non-Final Office Action in U.S. Appl. No. 11/323,042 dated Aug. 6, 2009 24 pages.

(Continued)

Primary Examiner — John Chavis
(74) Attorney, Agent, or Firm — Fish & Richardson P.C.

(57) ABSTRACT

Methods and apparatus, including computer program products, for accepting user input defining a first additional parameter to a first source code component, the first source code component not being modified. Accepting user input defining a first modification to the first source code component, the first modification dependent on the first additional parameter, and the source code component not being modified. Incorporating into a second source code component the first source code component and an expression of the first additional parameter and the first modification, the second source code component being separate from the first source code component. And creating a compiled program using the second source code component.

15 Claims, 6 Drawing Sheets

(56) References Cited

U.S. PATENT DOCUMENTS

| | | |
|---|---|---|
| 2004/0088698 A1 | 5/2004 | Claiborne |
| 2004/0237067 A1 | 11/2004 | Sun et al. |
| 2006/0288344 A1 | 12/2006 | Brodersen et al. |
| 2007/0157181 A1 | 7/2007 | Crasovan et al. |
| 2008/0022271 A1* | 1/2008 | D'Angelo et al. ............ 717/168 |

OTHER PUBLICATIONS

SAP Switch Framework Webpage, http://help.sap.com/saphelp_nw2004s/helpdata/en/af/e8b540afc87c2ae10000000a155106/frameset.htm, 15 pages, printed Nov. 6, 2006.

* cited by examiner

200 ⤵

```
class FOO definition.
methods:
    BAR
        importing
            number type I.
201⤳   exporting.
            result type P decimals 2.
204⤳   changing.
206⤳   returning.
208⤳   exceptions.
endclass.

class FOO implementation.
method BAR.
    data OREF type ref to CX_ROOT.
    data MESSAGE type STRING.
210⤳ try.
212⤳     result = SQRT(NUMBER).
224a⤳ catch CX_SY_ZERODIVIDE into OREF.
            MESSAGE = OREF->GET_TEXT().
224b⤳ cleanup.
214⤳     CLEAR result.
    endtry.
    write / TEXT.
216⤳ write:/'Final Result:', result.
endmethod.
endclass.
```

Enhancement 1.
```
        interface ipr_<enha_name>.      ⎫
        methods:                         ⎪
        m1    importing i1 type t1      ⎬ 502
              changing c1 type t2.       ⎪
        endinterface.                    ⎭ interface ipo_<enha_name>.       ⎫
        methods:                         ⎪
        m1    importing i1 type t1       ⎪
              changing c1 type t3       ⎬ 504
              e1 type t2.                ⎪
        endinterface.                    ⎭

Class lcl_<enha_name> DEFINITION.                              ⎫
        Public section.                                             ⎪
        class-data obj type ref to lcl_<enha_name>.                 ⎪
        data core_object type ref to cl_test.                       ⎪
        Interfaces: ipr_<enha_name>, ipo_<enha_name>.              ⎬ 506
            Methods:                                                ⎪
            CONSTRUCTOR                                             ⎪
            IMPORTING core_object type ref to CL_TEST.              ⎪
    Endclass.                                                       ⎭

Class lcl_<enha_name> IMPLEMENTATION.                           ⎫
        ⎧  Method CONSTRUCTOR.                                      ⎪
    514 ⎨      me->core_object = core_object.                       ⎪
        ⎩  Endmethod.                                               ⎪
                                                                    ⎪
        ⎧  Method ipr_<enha_name>~m1.                               ⎪
    510 ⎨                                                           ⎬ 508
        ⎩  Endmethod.                                               ⎪
                                                                    ⎪
        ⎧  Method ipo_<enha_name>~m1.                               ⎪
    512 ⎨                                                           ⎪
        ⎩  Endmethod.                                               ⎪
    Endclass.                                                       ⎭
Endenhancement.
```

FIG. 5

DYNAMIC SOFTWARE ENHANCEMENT PARAMETERS

CROSS-REFERENCE TO RELATED APPLICATIONS

U.S. patent application Ser. No. 11/323,042, FOR DYNAMIC SOFTWARE ENHANCEMENT, filed Dec. 30, 2005.

BACKGROUND

The present invention relates to dynamic software enhancement, and more particularly to enhancing software functionality without directly modifying the underlying source code.

Software obtained from software vendors, consultants or even different parties within the same organization or company can be modified in order to customize the software to suit a particular need or purpose. However, when upgrades or patches to the software are installed, modifications to the software can be lost. This requires that customizations be reintegrated after an upgrade to the software. This is a manual, time consuming process that is prone to errors, especially if the modifications are extensive.

SUMMARY OF THE INVENTION

The present invention provides methods and apparatus, including computer program products, that implement techniques for dynamic software enhancement.

In one general aspect, the techniques feature accepting user input defining a first additional parameter to a first source code component, the first source code component not being modified. Accepting user input defining a first modification to the first source code component, the first modification dependent on the first additional parameter, and the source code component not being modified. Incorporating into a second source code component the first source code component and an expression of the first additional parameter and the first modification, the second source code component being separate from the first source code component. And creating a compiled program using the second source code component.

The invention can be implemented to include one or more of the following advantageous features. The first source code component is a function or method definition. The first additional parameter has a type that is one of importing, exporting or changing. The first modification is at a first enhancement point. The first enhancement point is one of the following locations in the first source code component: function or method entry; function or method exit; or exceptional function or method exit. The first additional parameter is optional. Invoking the first source code component with the first additional parameter.

The invention can be implemented to realize one or more of the following advantages. It is possible to have more than one enhancement of source code and more than one implementation of an enhancement. Because enhancements are separate from the source code they enhance, enhancements can be documented and managed separately. An enhancement can be disabled. An enhancement can itself be enhanced in a higher software layer. Enhancement points are not explicitly defined in the source code they pertain to. An enhancement can add one or more parameters to a function or method definition. An enhancement can add additional source code to a function or method definition.

One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 2 illustrates possible enhancement points for a source code component.

FIG. 5 is an expression of a modification to a source code component.

Like reference numbers and designations in the various drawings indicate like elements.

DETAILED DESCRIPTION

The present invention relates to dynamic software enhancement, and more particularly to enhancing software without directly modifying the underlying source code.

Figure 1:
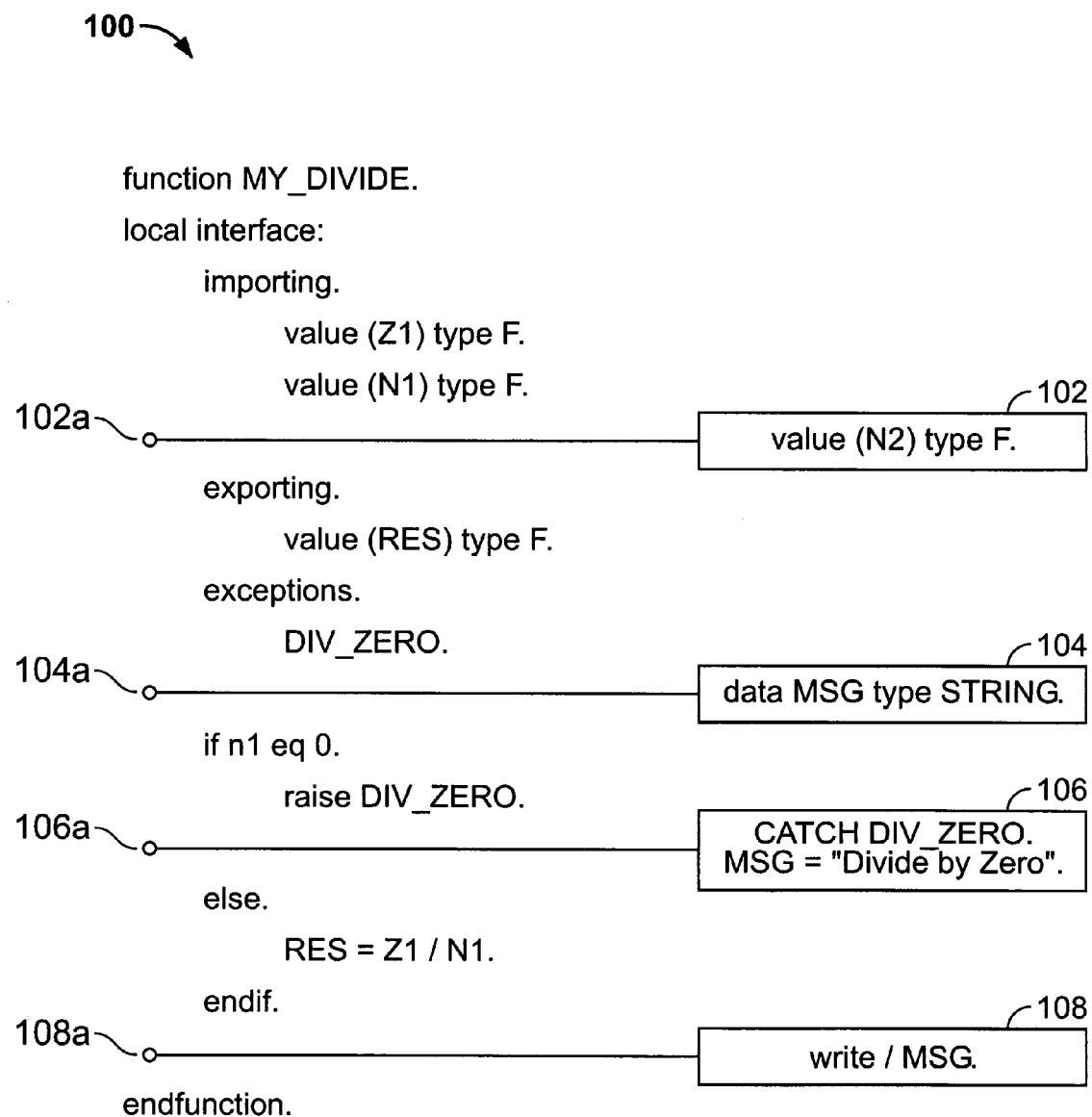
FIG. 1 is an illustration of source code showing illustrative modification points.

As shown in FIG. 1 and by way of illustration, source code 100 is a function definition for dividing a first number Z1 by a second number N1 in the ABAP (Advanced Business Application Programming) programming language, which is available from SAP AG of Walldorf, Germany. Users may desire to modify this function in various ways to better suit their needs. For example, a user may add one or more parameters 102 at location 102a. Or a user may add code (104, 108) to be invoked the beginning of the function (location 104a) or on return from the function (location 108a). Since this function raises an exception on division by zero, the user may also add an exception handler 106 at location 106a. Alternatively, the user may wish to replace the entire body of the function altogether. However, modifying the source code 100 creates problems if the source code is being maintained by an entity other than the user, such as a software vendor. Each time the source code 100 is updated by the entity, the user's changes must be added anew. This can be time consuming and error prone.

FIG. 2 illustrates possible enhancement points for a source code component 200. One or more modifications to a source code component can be incorporated with the source code component at enhancement points, but without modifying the source code component. A source code component incorporates source code such as a function, procedure or method definition or declaration. A modification represents a change to be incorporated into a copy of a source code component. By way of illustration, the copy can be a copy of the source code component. Or the copy can be a translation of the source code component to another form, e.g., an object code or intermediate language form. A modification can be represented as source code, editing directives, metadata, translated source code, or a combination of these. Integration of a modification to a component can include inserting the modification into the copy, deleting code from the copy, replacing code in the copy with the modification, or a combination of these.

Although this illustration is provided for the ABAP programming language, other programming languages are possible including combinations of languages. In this illustration, enhancement of a class method is illustrated; however, the same integrations are possible for functions. A class named FOO 218 defines a method named BAR 220. The BAR method 220 has two parameters: an importing parameter number which is an integer, and an exporting parameter result which is a packed number having two decimal places. One or more additional parameters can be incorporated at enhancement point 201 for importing type parameters, at enhancement point 204 for exporting type parameters, and at enhancement point 206 for changing type parameters.

One or more modifications are incorporated into a copy at one or more enhancement points to create an enhanced component. An enhancement point is an implicit location in the source code component (and hence the copy) where modifications can be incorporated. That is, enhancement points are not specifically identified in the source code component. More than one modification can be incorporated at a given enhancement point. In one implementation and by way of example, a modification is classified according to an enhancement point, as described in Table 1. Other enhancement points are possible.

TABLE 1

| MODIFICATION | ENHANCEMENT POINT |
| --- | --- |
| Overwrite-exit | Start of function/method. Replaces the entire body of a function/method with the modification. |
| Pre-Exit | Start of function/method, before original function/method code is executed. |
| Post-Exit | Normal exit point from a function/method. |
| Cleanup-Exit | Abnormal exit point from a function/method (e.g., upon reaching a "raise" statement in the ABAP language). |
| Catch-Exit | Exception handler used to catch a set of specific exceptions or all exceptions for a function/method. |
| Parameter | One or more additional parameters are specified for a function/method (e.g., at the end of the importing, exporting, changing, and tables section of a function/method definition in the ABAP programming language). In one implementation, an added parameter is an optional parameter. That is, the caller of a method of function does not need to specify the parameter. The one or more additional parameters can be used by modifications. If a modification uses an additional parameter, the modification is dependent on the additional parameter. |

The implementation of the BAR method is indicated by source code section 222. The method defines local variables OREF, which is a reference to type CX_ROOT, and MESSAGE, which is a string. There is a "try" block indicated by source code section 224. A "try" block allows exceptions handlers to be specified for exceptions that can be raised within the block. For example, a CX_SY_ZERODIVIDE handler 224a and a cleanup handler 224b are defined. An overwrite-exit type modification will entirely replace the source code 222. A pre-exit type modification can be incorporated at enhancement point 210. A post-exit type modification can be incorporated at enhancement point 216. In one implementation, a post-exit type modification can be invoked after a return from the method or function.

Any number of catch-exit type modifications for handling any number of exception types can be incorporated at enhancement point 212. In one implementation, the exception can optionally be passed on to an enclosing function/method after being handled. A cleanup-exit type modification can be incorporated at enhancement point 214. The exception can also be optionally passed to an enclosing function/method after being handled. Finally, post-exit enhancement types can be incorporated at enhancement point 216 or other points of normal function/method exit. Enhancement points other than those illustrated are possible.

The parameters of a source code component function can be optionally changed in accordance to TABLE 2. Fully typed tables parameters for ABAP functions are converted into changing parameters. Not fully typed table parameters are converted in changing parameters of the generic type table.

TABLE 2

| | IMPORTING | EXPORTING | CHANGING |
| --- | --- | --- | --- |
| Overwrite-Exit | Importing | Exporting | Changing |
| Pre-Exit | Importing | | Changing |
| Post-Exit | Importing | Changing | Changing |
| Post-Exit at Raise | Importing | Importing | Importing |
| Catch-Exit | Importing | Exporting | Changing |

Figure 3:
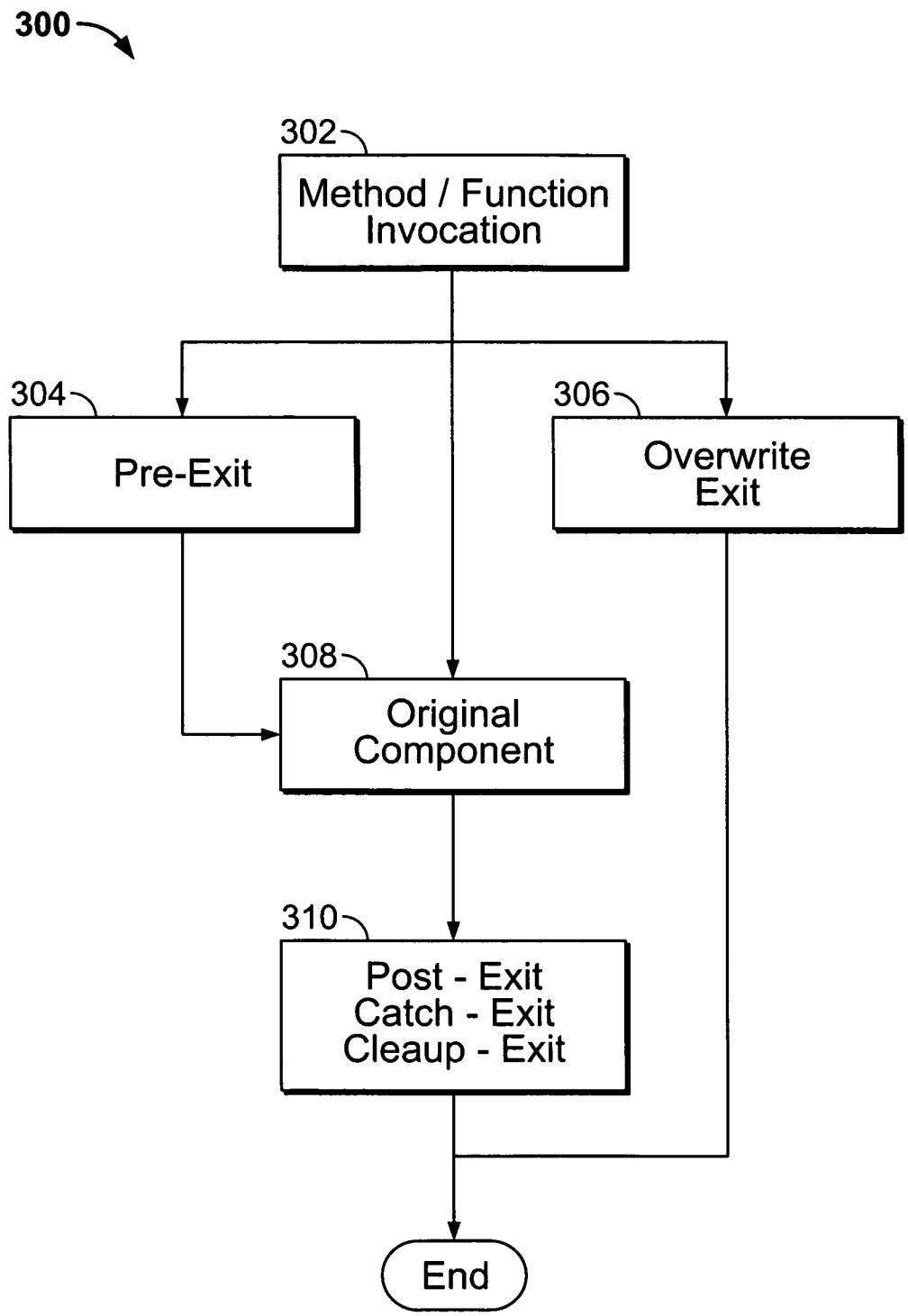
FIG. 3 illustrates execution of an enhanced source code component.

FIG. 3 illustrates execution of an enhanced method or function. The method/function is invoked (step 302). A method/function can be invoked any number of ways. For example, an invocation can be from a method, function, procedure, main program, event handler, or interrupt handler. If no pre-exit or overwrite-exit modification has been incorporated, the original source code for the function/method executes (step 308). If one or more pre-exit modifications have been incorporated, the one or more pre-exit modifications are executed before the original component (step 304). If one or more overwrite-exit modifications have been incorporated, the one or more overwrite-exit modifications are executed in lieu of the original component (step 306). During or after completion of execution of the original source code component, any post-exit, catch-exit or cleanup-exit modifications are executed (step 310). In one implementation, if a method or function has only importing or changing parameters, multiple overwrite-exit modifications are possible. In another implementation, when a method or a function has returning or exporting parameters, a special enhancement is automatically defined that combines the set of exporting and returning values to a single value.

Figure 4:
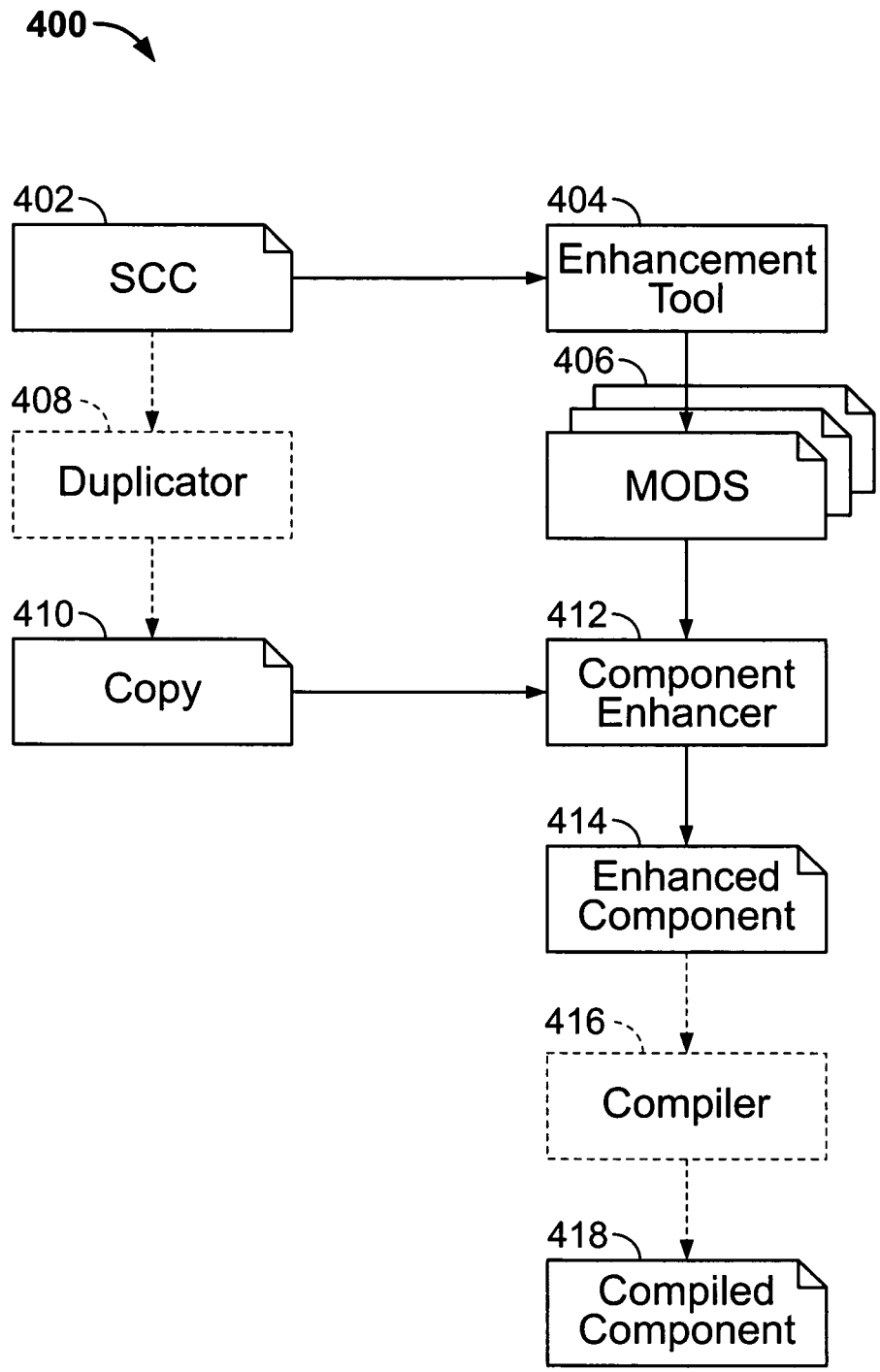
FIG. 4 is a diagram of a source code component modification system.

FIG. 4 is a diagram of a source code component modification system 400. Although a modification can be created by a process, an interactive enhancement tool 404 allows a user to create modifications for the source code component 402. In one implementation, the enhancement tool 404 is part of an integrated development environment (IDE) that provides a graphical user interface (GUI) that allows a user to create modifications using context-sensitive editors. An example of an IDE is the ABAP Workbench, available from SAP AG. Other user interfaces are possible, including user interfaces other than graphical, such as user interfaces incorporating speech recognition.

The enhancement tool 404 presents the source code component 402 to the user and allows the user to interactively "modify" the component at enhancement points. However, the modifications are maintained separately 406 from the source code component 402, even though it may appear to the user that the source code component 402 is being modified. In another alternative, the user interface 404 presents the source code component 402 (or a function/method declaration for the source code component) augmented with selectable GUI elements (e.g. buttons or hyperlinks) corresponding to enhancement points. By selecting such an element, the user is able to add one or more modifications for the chosen invocation point.

A component enhancer 412 incorporates an expression of the modifications 406 into a copy of the source code component 410 to create an enhanced component 414. The component enhancer 412 expresses the modifications 406 in the same form or a different form in the copy 410. The copy 410 of the source code component 402 is created by a duplicator component 408. The copy can be a modified or translated version of the source code component 402. For example, the copy 410 can be a byte code version of the source code component 402. The enhanced component 414 is compiled/translated by compiler 416 to create an enhanced component 418. By way of illustration, an enhanced component is source code, an intermediate language, machine independent or dependent code, instructions for a virtual or physical machine, or combinations of these. If the enhanced component 418 is not executable by itself, it can be compiled to create an executable compiled component.

A modification can itself be modified by the enhancement tool 404 to create modifications on top of modifications. For a example, a source code component is modified with a first modification mod1. A second modification mod2 then modifies mod1, and so on. Each modification is applied in order beginning with the first to create an enhanced component. For example, the component enhancer 412 integrates the copy 410 and mod1 to create a first enhanced component EC1. The enhanced component EC1 can then be further enhanced by mod2 to create a second enhanced component EC2, and so on. Alternatively, each modification mod1 . . . modn can be merged into a single modification which can then be applied to the copy 410.

If more than one modification is applicable to the same enhancement point, the modifications are incorporated into the copy 410 one after the other, in the order of creation, or in different order determined by information associated with modification. For example, a modification may be associated with a revision level so that revision modifications for earlier revisions are inserted ahead of later revisions. By way of a further example, a modification may be associated with a class of user (e.g., administrator, software developer, super user) where a class ordering determines the order of revisions.

By way of illustration, expressions of a pre-exit and post-exit modification are to be incorporated with source code component 402 which contains an ABAP class CL_TEST definition that defines a single method M1. In one implementation, the component enhancer incorporates into the copy 410 of CL_TEST (e.g., at enhancement point 208) a single local class 506 and one or more interfaces (502, 504) for each exit type modification in the modifications 406. See FIG. 5. The interfaces contain method declarations for all exit modifications defined for the copy 410. The user can add additional attributes and methods to the local class 506 but is not able to change the parameters or exceptions of the exit methods (510, 512) since the interfaces (502, 504) from which they depend are not editable.

The local class 508 has access to attributes and methods of the original class (CL_TEST) via a reference to the original class that is passed to the constructor 514 of the local class 508. Alternatively, all interfaces (502, 504) are declared as friends of the original class (CL_TEST) to allow access to private and protected attributes and methods of the original class. The local class 508 is handled as a normal local class inside of an ABAP function group. All global variables of the function group can then be accessed.

In addition to creating the interfaces and local class at enhancement point 208, the component enhancer 412 incorporates additional code into the copy 410 to cause invocation of the methods (510, 512) when the enhanced component 414 executes. For example, the following code is incorporated at enhancement point 208 for the pre-exit (where "<enha_name>"is the name of the enhancement):

```
Enhancement 2.
    If lcl_<enha_name>=>obj is initial.
        create object lcl_<enha_name>=>obj.
            exporting original_class = me.
    endif.
    lcl_<enha_name>=>obj ->ipr_<enha_name>~m1(
        Exporting
            I1 = ...
        Changing
            C1 = .... ).
Endenhancement.
```

And the following code is incorporated at enhancement point 216 for the post-exit:

```
Enhancement 3.
    If lcl_<enha_name>=>obj is initial.
        create object lcl_<enha_name>=>obj
            exporting original_class = me.
    endif.
    lcl_<enha_name>=>obj->ipo_<enha_name>~m1(
        Exporting
            I1 = ....
        Changing
            C1 = ...
            E1 = ... ).
Endenhancement.
```

Parameter modifications are incorporated into the copy 410 by the component enhancer 412. Usually the new parameters are then used inside the method or function module by another enhancement technique (e.g., a pre/post exist, a source code plugin). For example, to add a new import parameter to a function module (e.g. an integer named NEW_PARM with default value 10). The following code can be added to a parameter enhancement point for a copy of the source code component:

```
IMPORTING
    Enhancement 1.
        NEW_PARM TYPE I VALUE 10
    Endenhancement.
```

The enhancement will be added by the component enhancer to a copy of the function. Methods (e.g., M1 below) can similarly be enhanced, for example:

```
Class CL_TEST definition
public
    create public .
        public section.
            Methods M1
            importing
                P1_ORIG type I .
            Enhancement 1.
                NEW_PARM TYPE I DEFAULT 10
            Endenhancement.
```

In one implementation, enhancements consist of a source code part and a metadata part. The compiler combines a copy of the source code component and all enhancements into a compiled program (e.g., the complier searches for enhancements within the metadata.) Enhancements that are switched off globally are not considered at all. In one implementation, enhancements can be disabled statically (e.g., at compile time) or dynamically (e.g., at run time). Others that are switched on only for special circumstances or users, are compiled with surrounding 'if' statements.

Figure 6:
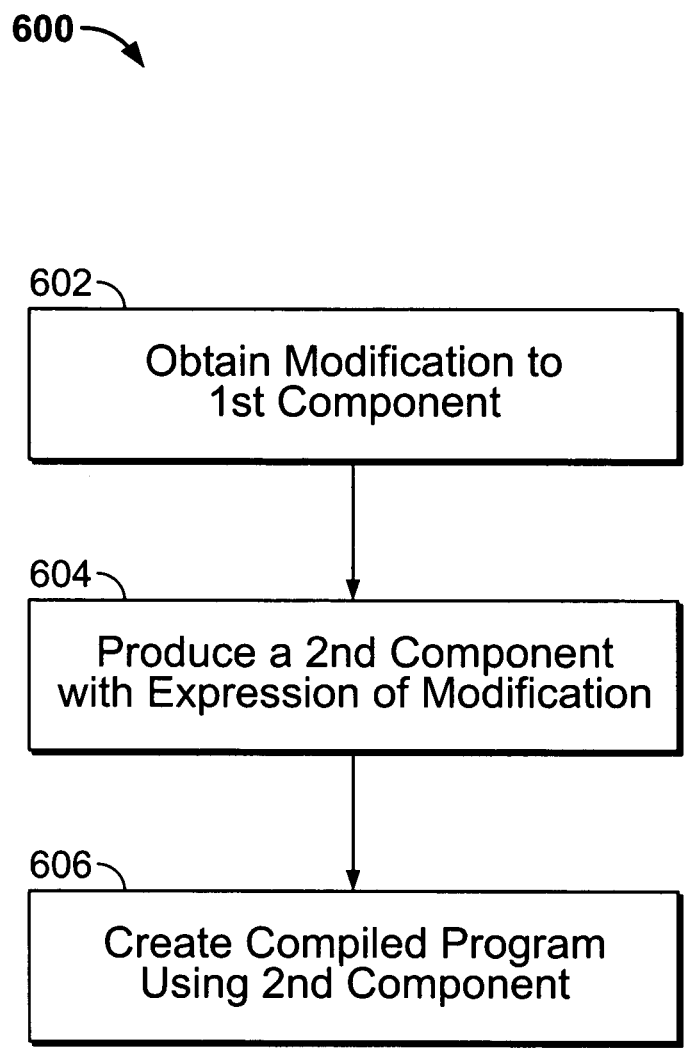
FIG. 6 is a flow diagram illustrating a method of enhancing a source code component.

FIG. 6 is a flow diagram 600 illustrating a method of enhancing a source code component. User input defining a first additional parameter to a first source code component and a first modification to the first source code component is obtained (step 602). The first modification to the first source code component can be dependent on the first additional parameter. The first source code component is not modified. A second source code component is produced by incorporating into the second source code component an expression of the first additional parameter and the first modification (step 604). A compiled program is created using the using the second source code component (step 606).

Source code is one or more (valid or invalid) statements or expressions in one or more programming languages or markup languages. Programming and markup languages can be defined by a grammar (e.g., generative, analytic, or ambiguous), e.g., without limitation, a context-free grammar (e.g., represented in Backus-Naur form), a regular grammar, a parsing expression grammar, or a link grammar. By way of illustration, a programming language can be procedural, functional, object-oriented, array-oriented, or a blend of two or more of these paradigms. Examples of programming languages include, without limitation, ABAP, Java® (available from Sun Microsystems, Inc. of Santa Clara, Calif.), JavaScript (also available from Sun Microsystems, Inc.), C++, C, Fortran, Perl, Lisp, Cobol, C#, J++, APL, APL2, A+, Glee, J, and K. A markup language can include without limitation any of the following: eXtensible Markup Language (XML), Hypertext Markup Language (HTML), Dynamic HTML (DHTML), and Extensible HTML (XHTML). Moreover, source code can also incorporate annotations, metadata and other information that is not part of a programming or markup language. For example, source code can include an XML Schema Definition (XSD) that describes the format of an XML document.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer program product, embodied in a non-transitory machine-readable storage device, the computer program product being operable to cause an apparatus to:
accept user input defining a first additional parameter to a first source code component, the first source code component not being modified;
accept user input defining a first modification to the first source code component at a first enhancement point within the first source code component, the first modification dependent on the first additional parameter, and the first source code component not being modified, the first enhancement point being provided as an implicit location in the first source code component where modifications can be incorporated, implicit locations not being explicitly identified in the first source code component;
incorporate into a second source code component the first source code component and an expression of the first additional parameter and the first modification, the second source code component being separate from the first source code component; and
create a compiled program using the second source code component,
wherein a location of the first enhancement point within the first source code component is dependent upon a type of the first modification.

2. The computer program product of claim 1, where:
the first source code component is a function or method definition.

3. The computer program product of claim 1, where:
the first additional parameter has a type that is one of importing, exporting or changing.

4. The computer program product of claim 1, where:
the location of the first enhancement point within the first source code component is one of the following: function or method entry; function or method exit; or exceptional function or method exit.

5. The computer program product of claim 1, further operable to cause the apparatus to:
invoke the first source code component with the first additional parameter.

6. A system comprising:
an apparatus;
a non-transitory machine-readable storage device coupled to the apparatus and having a computer program product stored therein, the computer program product being operable to cause the apparatus to:
accept user input defining a first additional parameter to a first source code component, the first source code component not being modified;
accept user input defining a first modification to the first source code component at a first enhancement point within the first source code component, the first modification dependent on the first additional parameter, and the first source code component not being modified, the first enhancement point being provided as an implicit location in the first source code component where modifications can be incorporated, implicit locations not being explicitly identified in the first source code component;
incorporate into a second source code component the first source code component and an expression of the first additional parameter and the first modification, the second source code component being separate from the first source code component; and
create a compiled program using the second source code component,
wherein a location of the first enhancement point within the first source code component is dependent upon a type of the first modification.

7. The system of claim 6, where:
the first source code component is a function or method definition.

8. The system of claim 6, where:
the first additional parameter has a type that is one of importing, exporting or changing.

9. The system of claim 6, where:
the location of the first enhancement point within the first source code component is one of the following: function or method entry; function or method exit; or exceptional function or method exit.

10. The system of claim 6, further operable to cause the apparatus to:
invoke the first source code component with the first additional parameter.

11. A method comprising:
accepting user input defining a first additional parameter to a first source code component, the first source code component not being modified;
accepting user input defining a first modification to the first source code component at a first enhancement point within the first source code component, the first modification dependent on the first additional parameter, and the first source code component not being modified, the first enhancement point being provided as an implicit location in the first source code component where modifications can be incorporated, implicit locations not being explicitly identified in the first source code component;
incorporating into a second source code component the first source code component and an expression of the first additional parameter and the first modification, the second source code component being separate from the first source code component; and
creating a compiled program using the second source code component,
wherein a location of the first enhancement point within the first source code component is dependent upon a type of the first modification.

12. The method of claim 11, where:
the first source code component is a function or method definition.

13. The method of claim 11, where:
the first additional parameter has a type that is one of importing, exporting or changing.

14. The method of claim 11, where:
the location of the first enhancement point within the first source code component is one of the following: function or method entry; function or method exit; or exceptional function or method exit.

15. The method of claim 11, further comprising:
invoking the first source code component with the first additional parameter.

* * * * *